(12) United States Patent
Asgarieh

(10) Patent No.: US 12,210,588 B2
(45) Date of Patent: Jan. 28, 2025

(54) SYSTEM AND METHOD FOR MODEL-AGNOSTIC META-LEARNER FOR NOISY DATA WITH LABEL ERRORS

(71) Applicant: YAHOO ASSETS LLC, Dulles, VA (US)

(72) Inventor: Eliyar Asgarieh, Mountain View, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 1077 days.

(21) Appl. No.: 17/009,977

(22) Filed: Sep. 2, 2020

(65) Prior Publication Data
US 2022/0067443 A1 Mar. 3, 2022

(51) Int. Cl.
| | |
|---|---|
| *G06F 18/214* | (2023.01) |
| *G06F 9/30* | (2018.01) |
| *G06F 18/213* | (2023.01) |
| *G06F 18/24* | (2023.01) |
| *G06N 20/00* | (2019.01) |

(52) U.S. Cl.
CPC ........ *G06F 18/2155* (2023.01); *G06F 9/3016* (2013.01); *G06F 18/213* (2023.01); *G06F 18/24* (2023.01); *G06N 20/00* (2019.01)

(58) Field of Classification Search
CPC .... G06F 18/2155; G06F 18/24; G06F 18/213; G06F 9/3016; G06N 20/00
See application file for complete search history.

(56) References Cited

U.S. PATENT DOCUMENTS

| | | | | |
|---|---|---|---|---|
| 10,614,207 | B1* | 4/2020 | Truong | G06N 3/088 |
| 2016/0140451 | A1* | 5/2016 | Li | G06N 20/00 |
| | | | | 706/12 |
| 2018/0053108 | A1* | 2/2018 | Olabiyi | G06N 3/044 |
| 2020/0167418 | A1* | 5/2020 | He | G06N 20/20 |

OTHER PUBLICATIONS

Yaroslav, et al. "Domain-adversarial training of neural networks." The journal of machine learning research 17.1 (2016): 2096-2030 (Year: 2016).*
Devlin et al., "Bert: Pre-training of deep bidirectional transformers for language understanding", arXiv preprint arXiv:1810.04805, Oct. 11, 2018, pp. 1-14.

(Continued)

*Primary Examiner* — Shahid K Khan
(74) *Attorney, Agent, or Firm* — Venable LLP

(57) ABSTRACT

The present teaching relates to method, system, medium, and implementations for machine learning. Machine learning is performed based on training data via a dual loop learning process that includes a first loop for data decoding learning and a second loop for label decoding learning. In the first loop, first parameters associated with decoding are updated to generate updated first parameters based on a first label, estimated via the decoding using the first parameters, and a second label, predicted via the label decoding using second parameters. In the second loop, the second parameters associated with the label decoding are updated to generate updated second parameters based on a third label, obtained via the decoding using the updated first parameters, and a ground truth label.

20 Claims, 10 Drawing Sheets

(56) References Cited

OTHER PUBLICATIONS

Litany et al., "Soseleto: A unified approach to transfer learning and training with noisy labels", arXiv preprint arXiv:1805.09622, May 24, 2018, pp. 1-10.

Liu et al., "Multi-task deep neural networks for natural language understanding", arXiv preprint arXiv: 1901.11504, Jan. 31, 2019, pp. 1-10.

Long et al., "Learning transferable features with deep adaptation networks", arXiv preprint arXiv: 1502.02791, May 27, 2015, pp. 1-9.

Tzeng et al., "Deep domain confusion: Maximizing for domain invariance", arXiv preprint arXiv: 1412.3474, Dec. 10, 2014, pp. 1-9.

Tzeng et al., "Adversarial Discriminative Domain Adaptation", 2017 IEEE Conference on Computer Vision and Pattern Recognition, 2017, pp. 2962-2971, Honolulu, HI, USA.

Finn et al., "Model-agnostic meta-learning for fast adaptation of deep networks", In Proceedings of the 34th International Conference on Machine Learning, 2017, pp. 1126-1135, vol. 70, Sydney, Australia.

Pei et al., "Multi-adversarial domain adaptation", The Thirty-Second AAAI Conference on Artificial Intelligence (AAAI-18), 2018, pp. 3934-3941, Association for the Advancement of Artificial Intelligence.

\* cited by examiner

SYSTEM AND METHOD FOR MODEL-AGNOSTIC META-LEARNER FOR NOISY DATA WITH LABEL ERRORS

BACKGROUND

1. Technical Field

The present teaching generally relates to computer. More specifically, the present teaching relates to machine learning.

2. Technical Background

In recent decades, the ubiquitous presence of the Internet and data access in electronic forms have facilitated advancement of various technologies, including big data analytics and machine learning. Artificial intelligence (AI) technologies and applications thereof usually rely on machine learning based on big data. This include supervised and unsupervised learning. Supervised or semi-supervised learning requires training data with labels that represent ground truth of the data. Thus, while a vast amount of data have been made available, to benefit supervised learning, providing labeled data is just as important.

The scarcity in reliable training data is a common obstacle for obtaining reliable and robust models via machine learning, especially for deep neural networks applications. Constant change in data distribution makes it even considerably more difficult to achieve a trustworthy solution to the problem. First, it is commonly recognized that annotating training data with labels for supervised learning is expensive and tedious. This is particularly so when it is done manually by annotators. Although different techniques have been developed to attempt to improve the efficiency and sufficiency in data labeling, e.g., via automated or semi-automated means, they still do not adequately solve the problem. For example, labels may be generated with consistent bias/noise depending on, e.g., the algorithms or annotators used to carry out the labeling.

Another issue has to do with the changes in label space which may frequently occur for reasons such as changes in editorial guidelines set for annotators or possibly other reasons that may not be ascertained. In some applications, such as classifying emails into different categories by training models to learn email categories can be particularly challenging because this classification problem addresses an extremely diverse and imbalanced environment with intertwined relation between ever changing (growing or shrinking) categories. Such problems need efficient machine learning models to capture semantics behind the emails rather than learning shallow signals and require sufficient human labeled data. However, it is not practically possible due to the costs associated with human annotators, time limitations, and more importantly dynamic changes in interpretations/definitions of different categories. Unreliable or inconsistent labels likely will render previously labeled data useless or at least inconsistent for training relevant classifiers and lead to models that are not effective.

This is illustrated in FIG. 1 (PRIOR ART) in which a traditional system is shown for training models based on data from different sources. As shown, there are four different sets of labeled data, including three data sources 130-1, 130-2, and 130-3 with inconsistent data sets and a consistent data set 140 with consistent/correct set of training data. Training data from source 130-1 may be a weakly supervised data (e.g., email data labeled based on html patterns rather than human judgements). Training data from source 130-2 may correspond to an older labeled data by humans with possibly some consistent errors in labels, present due to, e.g., changes in editorial guidelines to annotators, resulting in different interpretations of the data. Training data from source 130-3 may have both consistent labeling errors and missing labels for some categories. In multi-label classification problems, this may lead to incorrect/incomplete predictions for samples. Training data from target 140 may be the most consistent/correct set of training data available but it may be a small data set and not sufficient for training deep and more accurate models.

With such training data sets, models can be training in a multi-task learning framework as shown in FIG. 1. The models include a shared part and a part per tasks. The shared part of the model is trained simultaneously for several tasks and is referred to as an encoder 100. The encoder 100 takes input from any of 130-1, . . . , 130-3, and 140 and maps different inputs to a common vector representation, corresponding to an output to be used by the models defined per tasks. The models for per tasks are called decoders, i.e., decoder 1 110-1, decoder 2 110-2, decoder 3 110-3, and decoder 110-4 (individual classifiers), which use the vector representation from encoder 110 and predict the labels for that dataset (task). The learning for each of the decoders is based on a respective loss (e.g., loss 1 120-1 associated with decoder 1 110-1) determined based on a discrepancy between a predicted label from the decoder and the label from the training data. Thus, if the label from the training data is inconsistent or noisy, the quality of learning is negatively impacted.

In the presence of consistent errors between source tasks and target tasks, the multi-task learning as depicted in FIG. 1 may not lead to desirable learning result. The shared representation learned by the encoder 100 may not provide a proper separable feature space for target decoder(s), which are often shallow. Such representations may even degrade and become indistinguishable for the target tasks. In addition, the small size of the target task data may lead to severe overfitting to the training data.

Thus, there is a need for methods and systems that address the deficiency of existing approaches.

SUMMARY

The teachings disclosed herein relate to methods, systems, and programming for advertising. More particularly, the present teaching relates to methods, systems, and programming related to exploring sources of advertisement and utilization thereof.

In one example, a method, implemented on a machine having at least one processor, storage, and a communication platform capable of connecting to a network for machine learning. Machine learning is performed based on training data via a dual loop learning process that includes a first loop for data decoding learning and a second loop for label decoding learning. In the first loop, first parameters associated with decoding are updated to generate updated first parameters based on a first label, estimated via the decoding using the first parameters, and a second label, predicted via the label decoding using second parameters. In the second loop, the second parameters associated with the label decoding are updated to generate updated second parameters based on a third label, obtained via the decoding using the updated first parameters, and a ground truth label.

In a different example, a system for machine learning is provided. The system includes a decoder and at least one label decoder. The decoder is configured for decoding training data and each of the at least one label decoder is configured for predicting a label based on training data. The decoder and the at least one label decoder collaborate in a dual loop learning process having a first loop for data decoding learning and a second loop for label decoding learning. In the first loop, first parameters associated with the decoding are updated to generate updated first parameters based on a first label classified by the decoder using the first parameters and a second label predicted by the at least one label decoder using second parameters. In the second loop, the second parameters associated with the at least one label decoders are updated to generate updated second parameters based on a third label classified by the decoder using the updated first parameters and a ground truth label.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for machine learning. The data, when read by the machine, causes the machine to perform various steps as follows. Machine learning is performed based on training data via a dual loop learning process that includes a first loop for data decoding learning and a second loop for label decoding learning. In the first loop, first parameters associated with decoding are updated to generate updated first parameters based on a first label, estimated via the decoding using the first parameters, and a second label, predicted via the label decoding using second parameters. In the second loop, the second parameters associated with the label decoding are updated to generate updated second parameters based on a third label, obtained via the decoding using the updated first parameters, and a ground truth label.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to address the deficiencies of the traditional approaches in learning in presence of inconsistent and noisy labels. The present teaching discloses a solution to address the deficiency by introducing mapping functions in the label space of source tasks (or both feature and label spaces) that are trained using the target task data. The mapping functions may also be for both features and label spaces and the training of such mapping functions for labels are learned simultaneously with the rest of model parameters in a framework called multi-task dual loop learning scheme.

The present teaching presents a framework for meta-learning or learning-to-learn and is general and model agnostic. The multi-task dual loop learning scheme, as disclosed in the present teaching, incorporates two levels (loops) of optimization. In the first loop, the shared parts of the models (encoder and decoders) learned to adapt fast to the target task. The second loop involves the training of label decoders so that the mapping of labels can be optimized based on labels from target(s). The entire pipeline architecture of the multi-task dual loop learning process can be implemented and trained in an end-to-end fashion as a single coherent training. In this manner, not only encoder/decoder models can be trained and optimized, the label decoders or models that learn-to-learn for producing correct labels can be trained smoothly using target task data.

Figure 1:
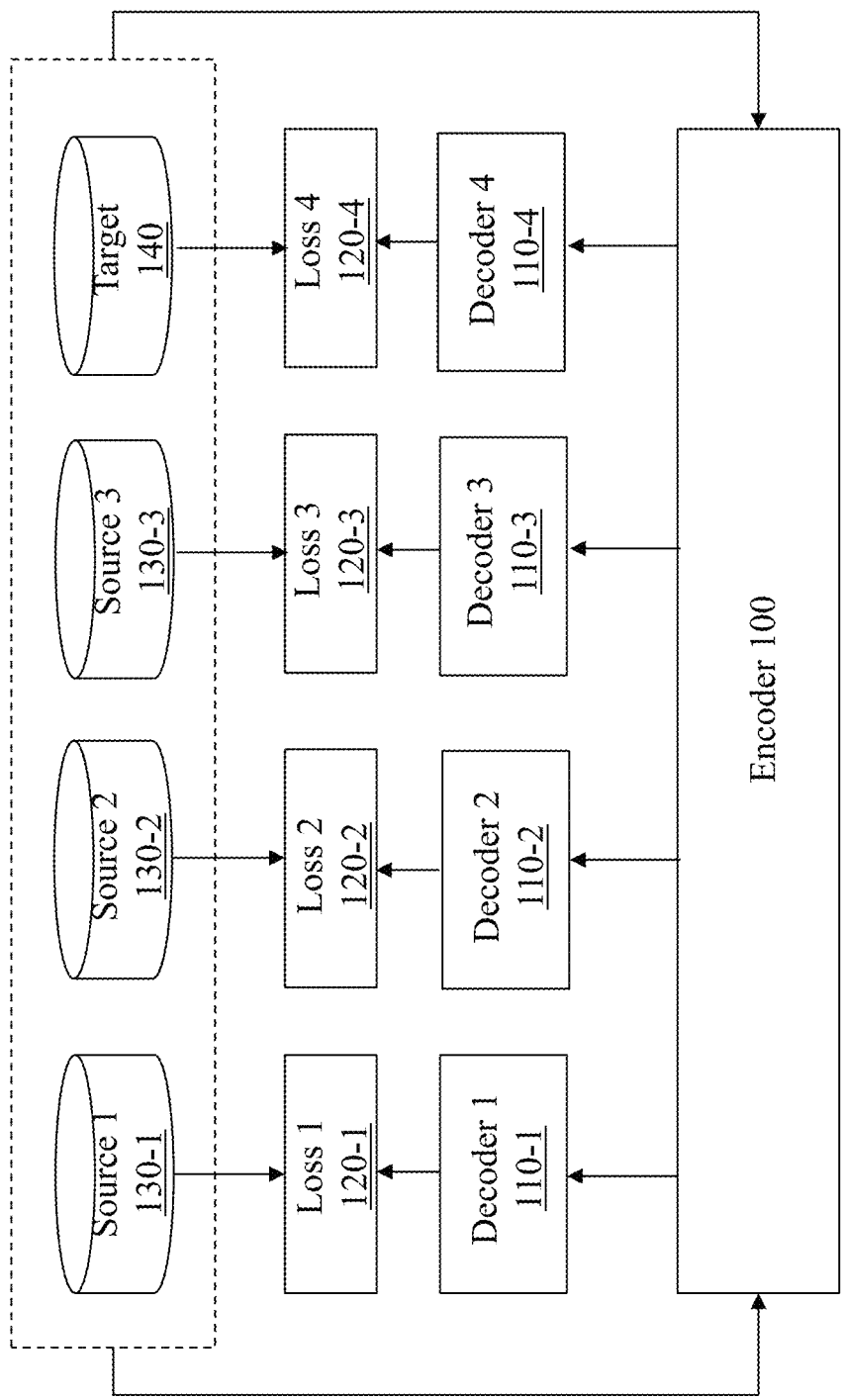
FIG. 1 (PRIOR ART) depicts a traditional multi-task learning framework.
Figure 2:
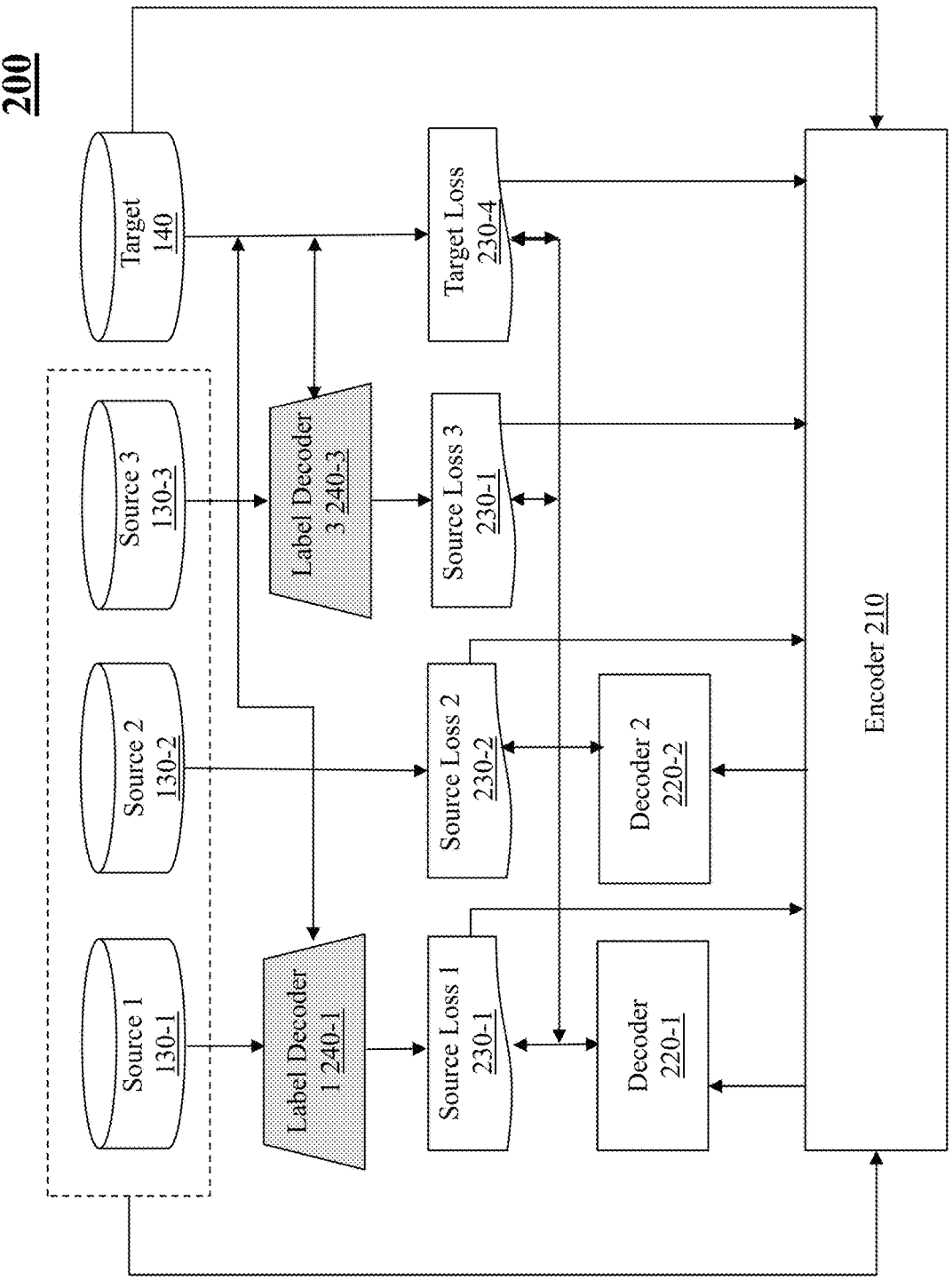
FIG. 2 depicts a multi-task dual loop learning framework with label decoders incorporated therein, in accordance with an embodiment of the present teaching.

FIG. 2 depicts an exemplary multi-task dual loop learning framework 200 with label decoders incorporated therein, in accordance with an embodiment of the present teaching. This exemplary framework 200 is provided for a scenario in which there are a plurality of data sources, i.e., source 1 130-1, source 2 130-2, source 3 130-3, and a target source 140, each of which may provide data with certain characteristics. For example, as discussed herein, data from source 130-1 may be a weakly supervised data (e.g., email data labeled based on html patterns rather than human judgements). Data from source 130-2 may correspond to an older labeled data by humans with possibly some consistent errors in labels, present due to, e.g., changes in editorial guidelines to annotators, resulting in different interpretations of the data. Data from source 130-3 may have both consistent labeling errors and missing labels for some categories. Data from target 140 may correspond to a small data set yet with the most consistent/correct set of training data.

As discussed herein, with data from such sources, traditional multi-label classification solutions may lead to incorrect/incomplete predictions for samples as the small training data set from the target 140 is generally not sufficient for training deep and more accurate models. To overcome such shortcomings, the multi-task dual loop learning framework 200 incorporate mechanism to allow learning, while training the traditional encoder and decoders, of mapping data to correct labels by leveraging the although small yet with consistent/correct set of training data from target 140 to bootstrap the capability of correcting inconsistent and noisy labels from other unreliable data sources.

In FIG. 2, the multi-task dual loop learning framework 200 comprises an encoder 210, a decoder 220-1, a decoder 2 220-2, a label decoder 1 240-1, and a label decoder 3 240-3. Label decoder 1 240-1 learns in this framework 200 to correctly predict labels for data associated with source 1 130-1 and label decoder 3 240-3 is trained in framework 200 for correctly predicting labels for data from source 3 130-3. Both label decoders 1 and 3 are trained to map data from their respective sources to correct labels by leveraging the consistent/reliable labels from target 140. That is, each label decoder maps data from its corresponding source to a label which is used to compare with a ground label from target 140 so that the discrepancy can be used for learning the mapping function used by the label decoder. The learning of a label decoder can be iterative and when the learning converges, such a label decoder can correctly predict a label for data provided.

In this exemplary illustration, as incorrect or inconsistent labels from source 2 130-2 are caused by changed interpretations of data due to changes in labeling criteria, no label decoder for data from source 2 130-2 to correct the inconsistent labeling due to human defined criteria change. However, labeling errors occurred in weakly supervised data (e.g., email data labeled based on html patterns rather than human judgements) from source 1 130-1 and consistent labeling errors and missing labels for some categories present in data from source 3 130-3 can be corrected via learning. Thus, label decoder 1 240-1 is introduced for learning correct label prediction for data from source 1 130-1 and label decoder 240-3 is included for learning correct label prediction for data from source 3 130-3. To facilitate simultaneously learning of decoding and label decoding with respect to sources 1, 3, and target, decoder 220-1 is used for collaborating with the label decoders 240-1 and 240-3 to allow learning model parameters for decoding data from source 1 130-1, source 3 130-3, and target 140 as well as models parameters for both label decoder 1 240-1 and label decoder 3 240-3. This simultaneous learning is carried out in the multi-task dual loop learning scheme as disclosed herein.

The simultaneous parameter learning for both data and label coding is implemented in the framework 200 with two loops: an inner loop and an outer loop. In the inner loop, parameters of encoder and decoders are trained, e.g., by back propagating gradients based on losses, e.g., source loss 1 230-1, source loss 2 230-2, and source loss 3 230-3 as well as target loss 230-4. As seen in FIG. 2, source loss 1 230-1 is directed to data from source 1 130-1 and is determined based on a predicted label from label decoder 240-1 and a label predicted by decoder 1 220-1 based on data from source 1 130-1. Source loss 2 230-2 is directed to data from source 2 130-2 and is determined based on a label from source 2 130-2 and a label predicted by decoder 2 220-2 based on data from source 2. Source loss 3 230-3 is directed to data from source 3 130-3 and is determined based on a predicted label from label decoder 3 240-3 and a label predicted by decoder 220-1 based on data from source 3 130-3. Target loss 230-4 is directed to data from target 140 and is determined based on a label from target 140 and a label predicted by decoder 220-1 based on data from the target. In the first loop, the label decoders 240-1 and 240-3 are assumed correct so that their predicted labels based on data from the respective sources are used as ground truth in learning the parameters of the encoder and decoders. In this first loop, based on a discrepancy between a label predicted by a decoder and a label output from a label decoder, parameters of encoder 210 and decoders 220-1 and 220-2 are updated (incremental learning).

In the outer loop, parameters for label decoders 240-1 and 240-3 are learned. In this outer loop, the parameters of encoder 210 and decoders 220-1 updated during the inner loop are used to facilitate learning the parameters of label decoders 240-1 or 240-3. Upon receiving target data from target 140, the updated encoder 210 encodes the target input to generate a target feature vector and sends to decoder 220-1, which then uses the model parameters updated during the inner loop to predict a label for the target feature vector. Based on a target label from 140, a target loss 230-4 can be computed based on the label predicted by decoder 220-1 and the target label retrieved from target 140. Based on the target loss 230-4, the label decoder 240-1 and label decoder 240-3 learns from the discrepancy represented by the target loss and then updates their respective model parameters by minimizing the target loss 230-4. The decoder 220-1 for both target and source tasks with label-decoder are set to be the same to enforce learning how to correct mapping for noisy labels.

Figure 3:
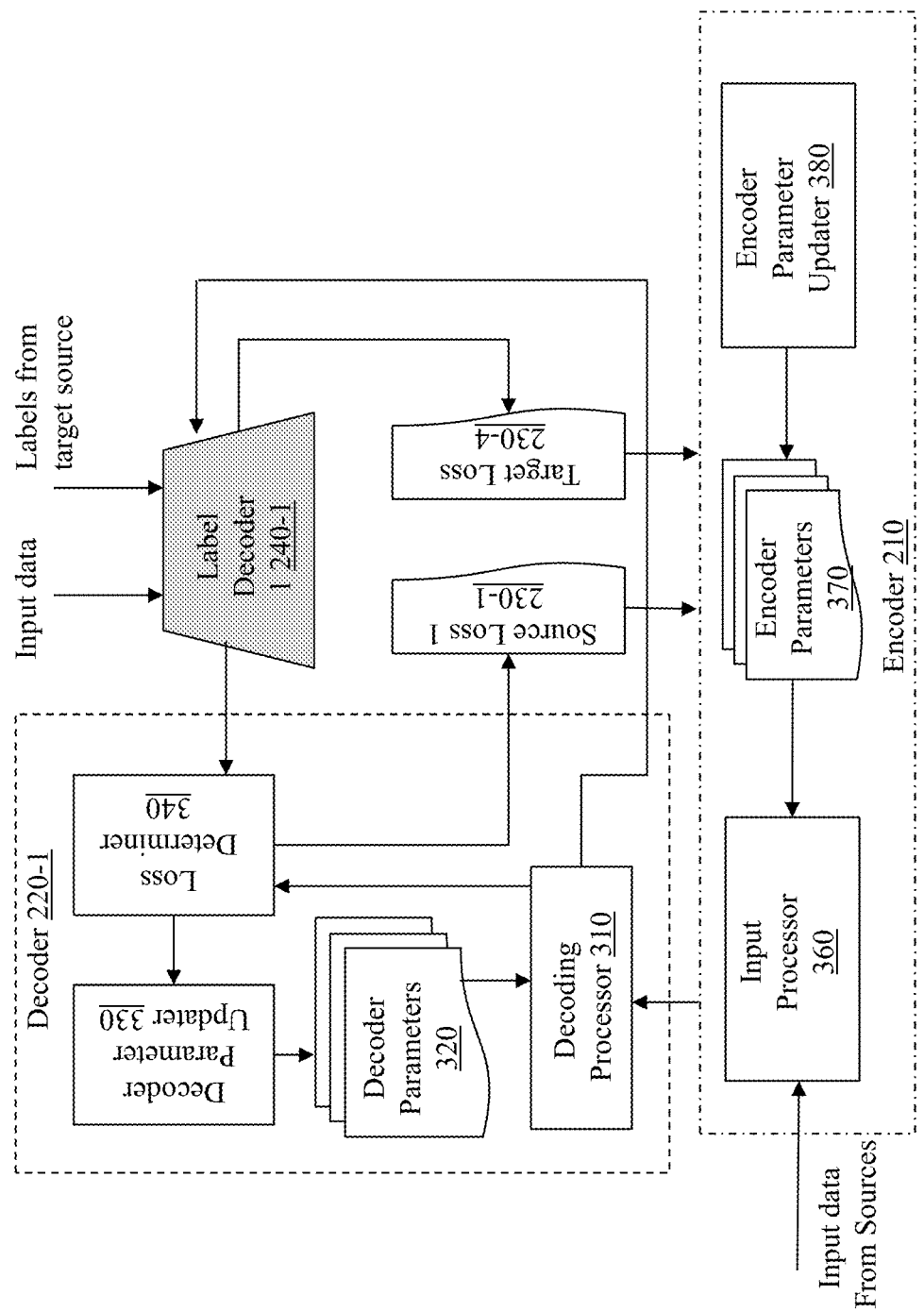
FIG. 3 depicts high level connections among an encoder, a decoder, and a label decoder to facilitate multi-task dual loop learning scheme, in accordance with an embodiment of the present teaching.

FIGS. 3-6B show in detail how this dual loop learning process facilitates learning of both data and label decoding. FIG. 3 depicts high level connections among encoder 210, decoder 220-1, and label decoder 240-1 to facilitate multi-task dual loop learning, in accordance with an embodiment of the present teaching. In this illustrated embodiment, the encoder 210, the decoder 220-1, the label decoder 1 240-1 are connected in the way as depicted in FIG. 2 yet with more internal structural details for the encoder 210 and decoder 220-1. Specifically, the encoder 210 comprises an input processor 360 and an encoder parameter updater 380, while the decoder 220-1 comprises a decoding processor 310, a loss determiner 340, and a decoder parameter updater 330. The label decoder 1 240-1 outputs its predicted label (based on the same input data) to decoder 220-1 in the inner loop as ground truth and takes the label predicted by decoder 220-1 (specifically by the decoding processor 310) in the outer loop in order to learn label decoding based on the actual ground truth label from target 140.

As discussed herein, data from sources 1 (130-1) and 3 (130-3) are noisy, e.g., containing consistent noise in the label space. Data from source 2 130-2 indicates a clean task that is different from the target classification task. A label-decoder may use information from the feature space data as well such as pooled representations from the source embedding space. This may be helpful in scenarios where some missing categories in sources can be easily identified using shallow signals in the feature space. Such an architecture is flexible for integrating various discrepancy losses/regularizations such as maximum mean discrepancy or adversarial training for learning domain-agnostic features. Such losses can be imposed on the representation learned per classes among different sources using the learned mapped labels in noisy sources during training.

Figure 4A:
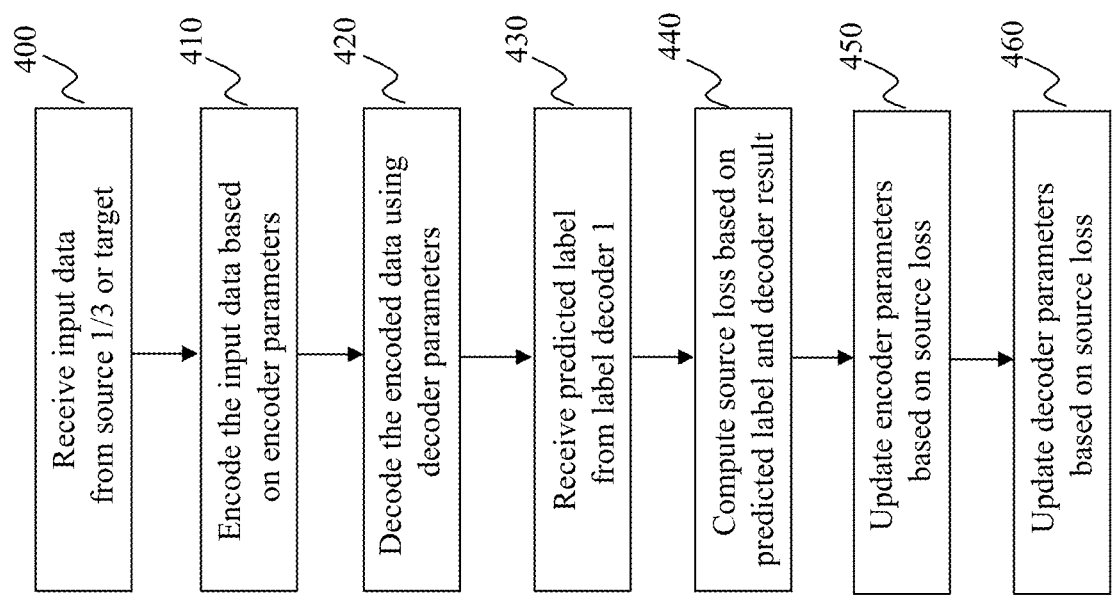
FIG. 4A is a flowchart of an exemplary inner loop process in a multi-task dual loop learning scheme, in accordance with an embodiment of the present teaching.

FIG. 4A is a flowchart of an exemplary inner loop process of the multi-task dual loop learning scheme, in accordance with an embodiment of the present teaching. In the inner loop of the operation, when encoder 210 receives, at 400, input data (from source 1, source 3, or target), the input processor 360 processes the input data and encodes, at 410, the input data based on encoder parameters stored in 370 to generate a feature vector in the feature space. Such encoded input data is then sent from the encoder 210 to the decoder 220-1, which decodes, at 420, the encoded input data and predicts a label based on the stored decoder parameters. The predicted label from the decoding processor is then sent to the loss determiner 340. To determine the source loss 1 230-1, the loss determiner 340 takes the label predicted by the decoding processor 310 as an input, receives, at 430, a label predicted by the label decoder 1 240-1, and computes, at 440, the source loss 1 230-1. The source loss 1 is then sent to the decoder parameter updater 330, which updates, at 450, the decoder parameters stored in 320 by minimizing the source loss 1. In the meantime, the source loss 1 230-1 is also sent to the encoder 210 and used by the encoder parameter updater 380 to update, at 460, the encoder parameters stored in 370 by minimizing the source loss 1 230-1. In this manner, in the inner loop, both encoder 210 and decoder 220-1 learn and update their model parameters based on source loss. As seen, in the inner loop, the label decoder 1 240-1 is assumed correct and generates a predicted ground truth label to facilitate learning of model parameters for both encoder 210 and decoder 220-1.

Specifically, assume that encoder parameters are denoted by $\Theta$, decoder parameters by $\Phi$, and label-decoder parameters by $\eta$. It is further assumed that there are two types of data, one is a large pool of noisy data, i.e., from sources 1 130-1 and 3 130-3, and the other is a limited amount of clean data, i.e., from target 140. Denote inputs in feature space for noisy source data and clean target by $X_s$ and $X_t$, respectively. The corresponding original labels are denoted as $Y_s$ and $Y_t$. Define decoding result as $\hat{Y}_s = \Phi(\Theta(X_s))$, where $\hat{Y}_s$ represents the predicted label from decoder 220-1 based on source input data $Y_s$. The predicted ground truth label from the label decoder 220-1 is $(\eta \cdot (Y_s))$. Then, the source loss $L_s$ is computed as:

$$L_s = \eta \cdot ((\eta \cdot (Y_s)), \Phi(\Theta(X_s))) \quad (1)$$

which is minimized in so that the encoder parameters $\Theta$ are updated to $\hat{\Theta}$ and decoder parameters $\Phi$ are updated to $\hat{\Phi}$. The updated encoder parameters $\hat{\Theta}$ and the updated decoder parameters $\hat{\Phi}$ are then used in the outer loop. The following exemplary formulae may be used to update the encoder and decoder parameters based on source loss:

$$\hat{\Phi} = \Phi - \alpha \frac{d}{d\Phi} L_s \quad (2)$$

$$\hat{\Theta} = \Theta - \alpha \frac{d}{d\Theta} L_s \quad (3)$$

where $\alpha$ here corresponds to a learning rate and d/dx represents the gradient with respect to x.

Figure 4B:
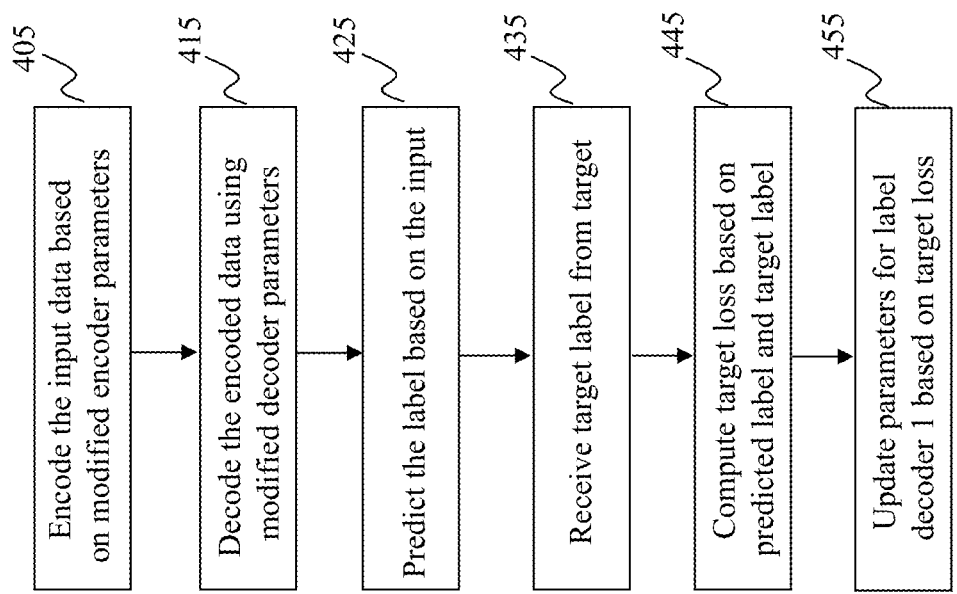
FIG. 4B is a flowchart of an exemplary outer loop process in a multi-task dual loop learning scheme, in accordance with an embodiment of the present teaching.

In the outer loop of the operation, the label decoder 220-1 learns its model parameters based on discrepancy between a predicted label from the decoder 220-1 using the updated encoder/decoder parameters and an actual ground truth label from the target data set 140. FIG. 4B is a flowchart of an exemplary outer loop process in the multi-task dual loop learning scheme, in accordance with an embodiment of the present teaching. As discussed herein, the model parameters for the label decoders are learned by minimizing the target loss. In the outer loop, the encoder 210 encodes, at 405, target input data $X_t$ based on updated encoder parameters $\hat{\Theta}$ and sends the encoded input data to the decoding processor 310, which decodes, at 415, the encoded target input data based on the updated decoder parameters $\hat{\Phi}$ to generate, at 425, a predicted target label $\hat{Y}_t$. For the label decoder 1 240-1 to update its model parameters $\eta$, the label decoder 1 240-1 receives, at 435, an actual ground truth label $Y_t$ from target 140. Based on the predicted label $\hat{Y}_t$ and the actual ground truth label $Y_t$, the target loss 230-4 is computed at 445 and such computed target loss is then minimized to update the label decoder parameters $\eta$. Details about the construct and operation of the label decoder 1 240-1 is provided with respect to FIGS. 5-6B.

Specifically, the formulation of the solution to the outer loop is provided below. The decoding result is expressed as:

$$\hat{Y}_t = \hat{\Phi}(\hat{\Theta}(X_t)) \quad (4)$$

where $\hat{\Phi}$ and $\hat{\Theta}$ correspond to respectively the encoder and decoder parameters updated during the inner loop. The target loss $L_t$ is computed as follows:

$$L_t = \eta \cdot (Y_t, \hat{\Phi}(\hat{\Theta}(X_t)) \quad (5)$$

where $Y_t$ is the target ground truth label. As discussed herein, the label decoder parameters n are updated by minimizing this target loss. The following exemplary formulae may be used to update the label decoder parameters based on the target loss:

$$\hat{\eta} = \eta - \alpha \frac{d}{d\eta} L_t \quad (6)$$

Similarly, $\alpha$ here corresponds to a learning rate and $$\frac{d}{dx}$$

represents the gradient with respect to x. In this manner, the label decoder 240-1 learns model parameters in correctly mapping input data to consistent/accurate labels.

Although the above illustrated operation is discussed in connection with the decoder 220-1 and the label decoder 1 240-1, the operation may be similarly applied between the decoder 220-1 and the label decoder 3 240-3. In addition, although the exemplary embodiments use data sources with specific characteristics in terms of labels, the embodiments are merely for illustration instead of limitation. The multi-task dual loop learning framework as discussed herein may be use for learning multiple tasks in a cooperative manner without limitation.

Figure 5:
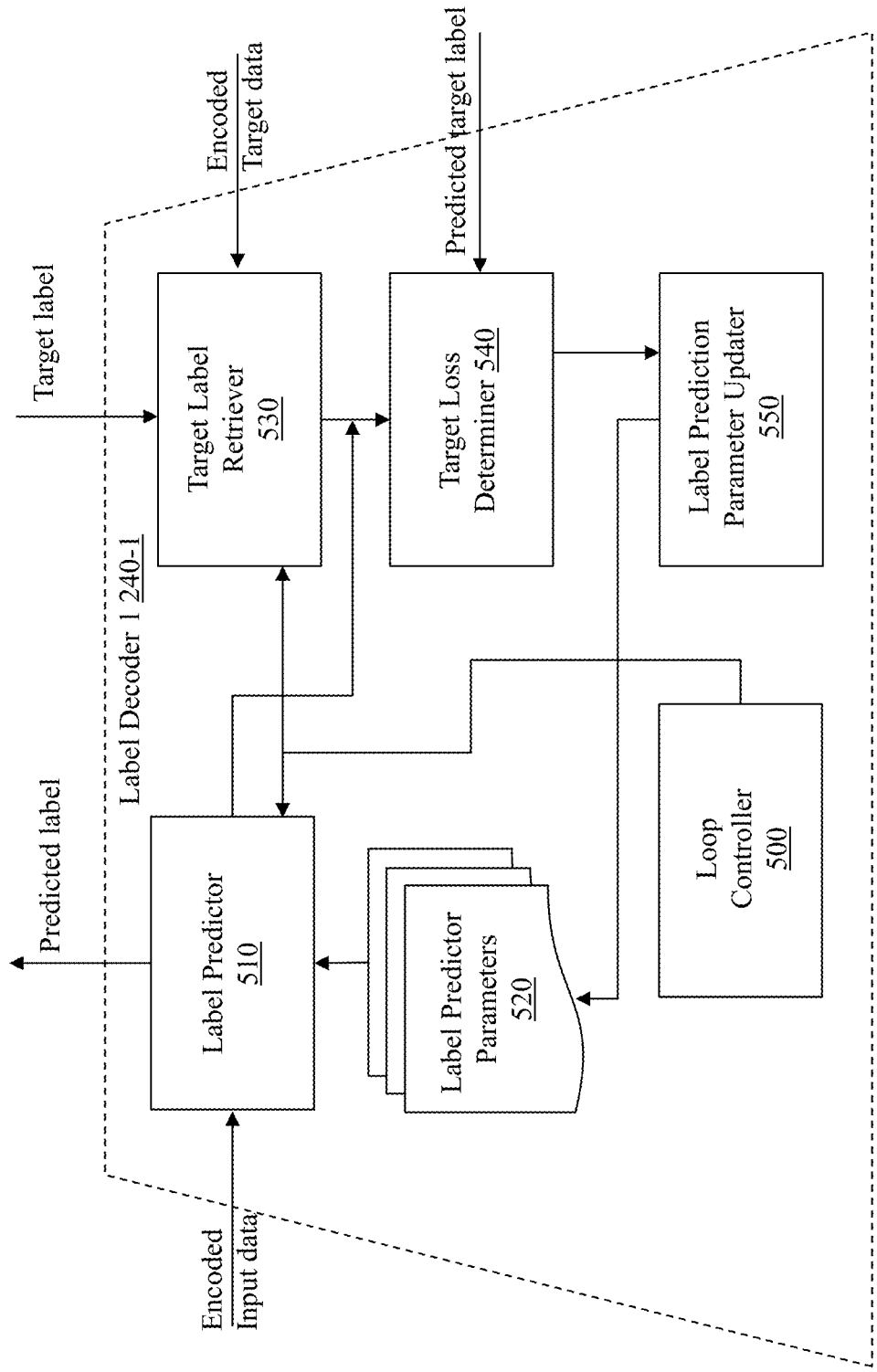
FIG. 5 depicts an exemplary high level system diagram of a label decoder, in accordance with an embodiment of the present teaching.

FIG. 5 depicts an exemplary high level system diagram of a label decoder, in accordance with an embodiment of the present teaching. The following example as illustrated in FIG. 5 is directed to label decoder 1 240-1. However, other label decoders, e.g., label decoder 3 240-3, may be deployed and operate in the same way. In this illustrated embodiment, the label decoder 240-1 comprises different components, including a loop controller 500, a label predictor 510, a target label retriever 530, a target loss determiner 540, and a label prediction parameter updater 550. Some of the components in the label decoder 240-1 are operative during the inner loop, some are operative in the outer loop, and some are active in both loops. For example, the label predictor 510 is activated during the inner loop, while the target label retriever 530, the target loss determiner 540, and the label prediction parameter updater 550 are activated during the outer loop. The loop controller 500 may be deployed to control the activation of appropriate components in each of the loops. As discussed herein, in the inner loop, the label decoder is assumed to be correct and is used to predict a ground truth (not actual) label that is used for updating the encoder and decoder parameters based on the source loss. In the outer loop, the label decoder learns and updates its label predictor parameters stored in 520 by minimizing the target loss determined based on an actual ground truth label retrieved from target 140.

Figure 6A:
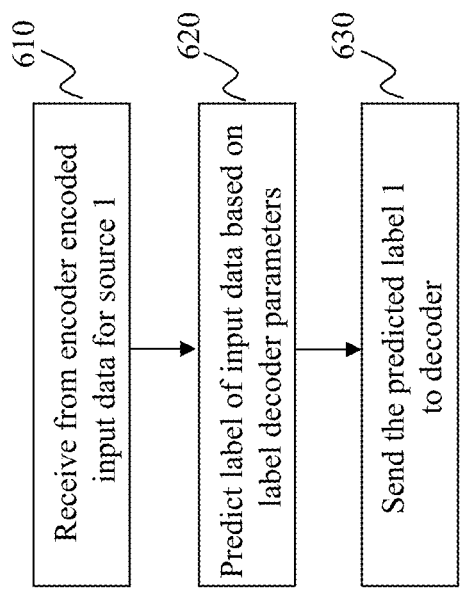
FIG. 6A is a flowchart of an exemplary inner loop process of a label decoder in a multi-task dual loop learning scheme, in accordance with an embodiment of the present teaching.

FIG. 6A is a flowchart of an exemplary inner loop process of the label decoder 1 240-1 in a multi-task dual loop learning scheme, in accordance with an embodiment of the present teaching. To facilitate the learning of encoder/decoder parameters in the inner loop, the label decoder 1 240-1 receives, at 610, input from the encoder 210 encoding input data from source 1 130-1. Based on the encoded input data from source 1, the label decoder 1 240-1 predicts, at 620, a predicted label of the input data based on the label predictor parameters in 520. Such predicted label is then sent, at 630, to decoder 220-1 and encoder 210 to facilitate the learning and subsequent update of respective encoder/decoder parameters. As discussed herein, during the inner loop, the label decoder 1 240-1 is assumed correct so that the predicted label is used as a ground truth label to compute the source loss, based on which parameter updates are carried out.

Figure 6B:
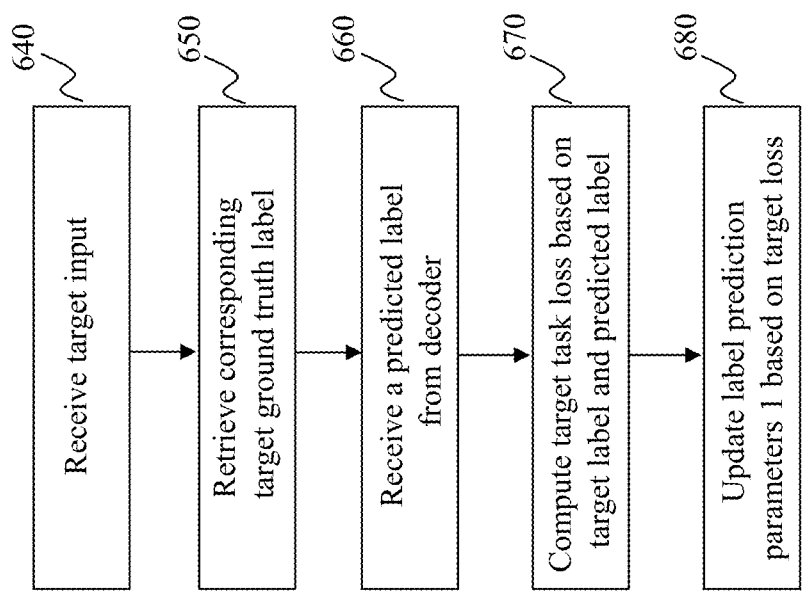
FIG. 6B is a flowchart of an exemplary outer loop process of a label decoder in a multi-task dual loop learning scheme, in accordance with an embodiment of the present teaching.

FIG. 6B is a flowchart of an exemplary outer loop process of the label decoder 1 240-1 in a multi-task dual loop learning scheme, in accordance with an embodiment of the present teaching. As disclosed herein, the outer loop is to facilitate the label decoder to learn or update its label predictor parameters by minimizing the target loss computed based on the actual ground truth label from target and the predicted label by the decoder using the encoder/decoder parameters updated during the inner loop. In operation, the label decoder 1 240-1 receives, at 640, target input data and proceeds to retrieve, at 650, a corresponding actual ground truth label for the target input from 140. To compute the target loss, the target loss determiner 540 receives, at 660, a label predicted by the decoder 220-1, where the predicted target label is generated based on the target input and the decoder parameters updated during the inner loop. Predicted target label and the actual ground truth target label, the target loss determiner 540 computes, at 670, the target loss, which is then used by the label prediction parameter update 550 to update the label predictor parameters stored in 520 by minimizing the target loss in accordance with, e.g., the formulae discussed herein.

As seen above, through this dual loop multi-task learning scheme, encoder, decoders, and the label decoders may collaborate in the above described exemplary manner to allow the system to simultaneously learn not only model parameters for encoder(s) and decoders but also label decoding parameters so that the small target data set with accurate/consistent labels may be leveraged to enhance the ability of the system to learn how to correct inconsistent/incorrect labels present in noisy source data.

Figure 7:
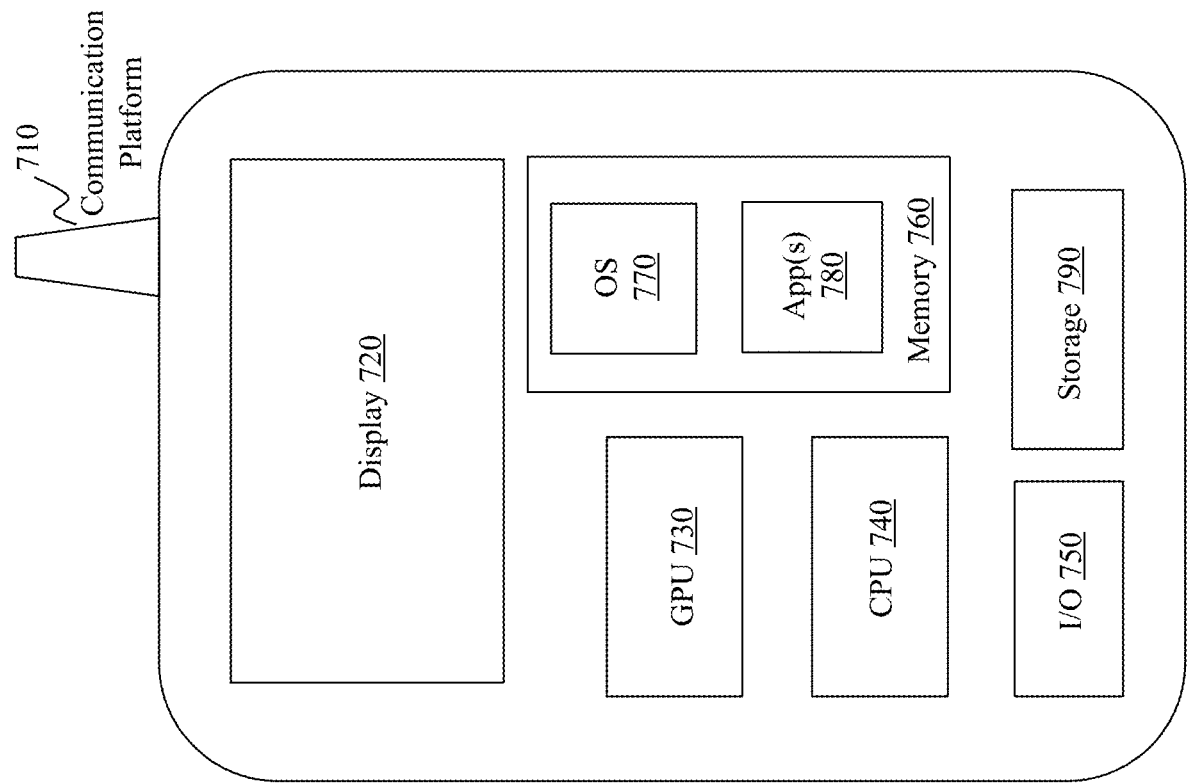
FIG. 7 is an illustrative diagram of an exemplary mobile device architecture that may be used to realize a specialized system implementing the present teaching in accordance with various embodiments.

FIG. 7 is an illustrative diagram of an exemplary mobile device architecture that may be used to realize a specialized system implementing the present teaching in accordance with various embodiments. In this example, the user device on which the present teaching is implemented corresponds to a mobile device 700, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 700 may include one or more central processing units ("CPUs") 740, one or more graphic processing units ("GPUs") 730, a display 720, a memory 760, a communication platform 710, such as a wireless communication module, storage 790, and one or more input/output (I/O) devices 740. Any other suitable component, including but not limited to a system bus or a controller (not shown), may also be included in the mobile device 700. As shown in FIG. 7, a mobile operating system 770 (e.g., IOS, Android, Windows Phone, etc.), and one or more applications 780 may be loaded into memory 760 from storage 790 in order to be executed by the CPU 740. The applications 780 may include a browser or any other suitable mobile apps for managing a machine learning system according to the present teaching on mobile device 700. User interactions, if any, may be achieved via the I/O devices 740 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 8:
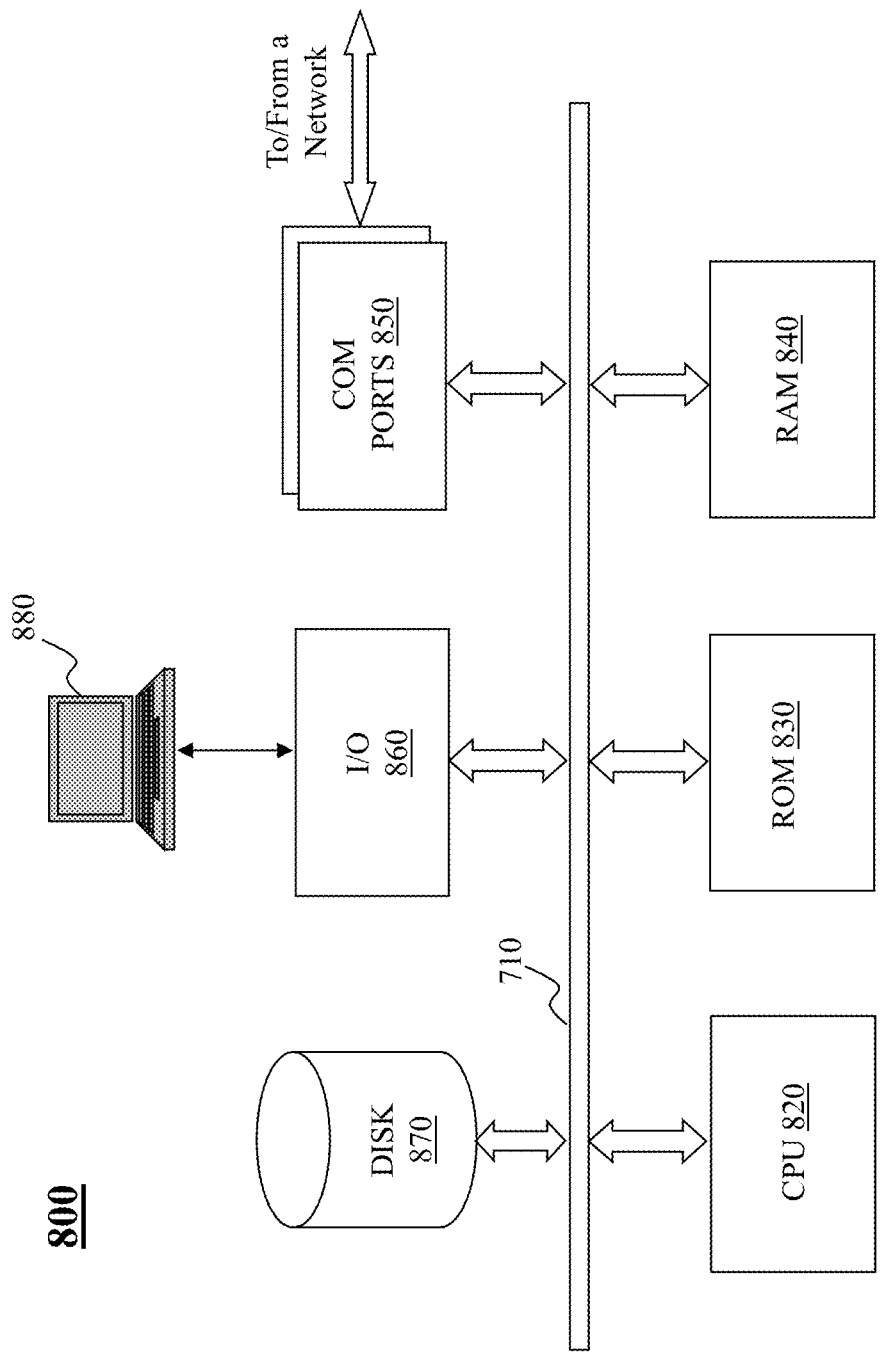
FIG. 8 is an illustrative diagram of an exemplary computing device architecture that may be used to realize a specialized system implementing the present teaching in accordance with various embodiments.

FIG. 8 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 800 may be used to implement any component of the multi-task dual loop learning scheme, as described herein. For example, the learning system as disclosed herein may be implemented on a computer such as computer 800, via its hardware, software program, firmware, or a combination thereof. Although only one such computer is shown, for convenience, the computer functions relating to the conversation management system as described herein may be implemented in a distributed fashion on a number of similar platforms, to distribute the processing load.

Computer 800, for example, includes COM ports 850 connected to and from a network connected thereto to facilitate data communications. Computer 800 also includes a central processing unit (CPU) 820, in the form of one or more processors, for executing program instructions. The exemplary computer platform includes an internal communication bus 810, program storage and data storage of different forms (e.g., disk 870, read only memory (ROM) 830, or random access memory (RAM) 840), for various data files to be processed and/or communicated by computer 800, as well as possibly program instructions to be executed by CPU 820. Computer 800 also includes an I/O component 860, supporting input/output flows between the computer and other components therein such as user interface elements 880. Computer 800 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method implemented on at least one machine including at least one processor, memory, and communication platform capable of connecting to a network for machine learning, the method comprising:
   performing machine learning based on training data via a dual loop learning process having a first loop for data decoding learning and a second loop for label decoding learning for correcting labeling errors in training data provided by a source, wherein
   in the first loop, first parameters associated with the data decoding are updated to generate updated first parameters based on a first label estimated via the data decoding using the first parameters and a second label predicted via the label decoding using second parameters, wherein the second label is a predicted ground truth label, and
   in the second loop, the second parameters associated with the label decoding are updated to generate updated second parameters based on a third label obtained via the data decoding using the updated first parameters and a correctly labeled ground truth label provided by a target, wherein the updated second parameters are used to predict the second label in the first loop based on the training data including the labeling errors.

2. The method of claim 1, wherein the first loop comprises:
   receiving first input data from the source;
   classifying, based on the first parameters, the first input data to have the first label;
   receiving the second label predicted by the label decoding based on the input data and second parameters;
   determining a source loss based on the first label and the second label; and
   generating the updated first parameters based on the source loss.

3. The method of claim 2, wherein the source provides training data with inconsistent, incorrect, and missing labels.

4. The method of claim 2, wherein the first parameters associated with the data decoding include encoder parameters and decoder parameters.

5. The method of claim 4, wherein the step of classifying comprises:
   encoding, based on the encoder parameters, the first input data to generate a feature vector; and
   decoding, based on the decoder parameters, the first input data in accordance with the encoded feature vector to generate the first label.

6. The method of claim 1, wherein the second loop comprises:
   receiving second input data from the target, wherein the second input is associated with the correctly labeled ground truth label;
   classifying the second input data to have the third label based on the updated first parameters;
   determining a target loss based on the third label and the correctly labeled ground truth label; and
   updating the second parameters based on the target loss.

7. The method of claim 6, wherein the target provides training data with the correctly labeled ground truth label.

8. Machine readable and non-transitory medium having information recorded thereon for machine learning, wherein the information, once read by the machine, causes the machine to perform:
   performing machine learning based on training data via a dual loop learning process having a first loop for data decoding learning and a second loop for label decoding learning for correcting labeling errors in training data provided by a source, wherein
   in the first loop, first parameters associated with the data decoding are updated to generate updated first parameters based on a first label estimated via the data decoding using the first parameters and a second label predicted via the label decoding using second parameters, wherein the second label is a predicted ground truth label, and
   in the second loop, the second parameters associated with the label decoding are updated to generate updated second parameters based on a third label obtained via the data decoding using the updated first parameters and a correctly labeled ground truth label provided by a target, wherein the updated second parameters are used to predict the second label in the first loop based on the training data including the labeling errors.

9. The medium of claim 8, wherein steps performed in the first loop comprises:
   receiving first input data from the source;
   classifying, based on the first parameters, the first input data to have the first label;
   receiving the second label predicted by the label decoding based on the input data and second parameters;
   determining a source loss based on the first label and the second label; and
   generating the updated first parameters based on the source loss.

10. The medium of claim 9, wherein the source provides training data with inconsistent, incorrect, and missing labels.

11. The medium of claim 9, wherein the first parameters associated with the data decoding include encoder parameters and decoder parameters.

12. The medium of claim 11, wherein the step of classifying comprises:
   encoding, based on the encoder parameters, the first input data to generate a feature vector; and
   decoding, based on the decoder parameters, the first input data in accordance with the encoded feature vector to generate the first label.

13. The medium of claim 8, wherein steps performed in the second loop comprises:
   receiving second input data from the target, wherein the second input is associated with the correctly labeled ground truth label;
   classifying the second input data to have the third label based on the updated first parameters;
   determining a target loss based on the third label and the correctly labeled ground truth label; and
   updating the second parameters based on the target loss.

14. The medium of claim 13, wherein the target provides training data with the correctly labeled ground truth label.

15. A system for machine learning, comprising:
   the system comprising:
   memory storing computer program instructions; and
   one or more processors that, in response to executing the computer program instructions, effectuate operations comprising:
   performing machine learning based on training data via a dual loop learning process having a first loop for data decoding learning and a second loop for label decoding learning for correcting labeling errors in training data provided by a source wherein
   in the first loop, first parameters associated with the data decoding are updated to generate updated first parameters based on a first label classified by the data decoding using the first parameters and a second label predicted by the label decoding using second parameters, wherein the second label is a predicted ground truth label, and
   in the second loop, the second parameters associated with the label decoding are updated to generate updated second parameters based on a third label classified by the data decoding using the updated first parameters and a correctly labeled ground truth label provided by a target, wherein the updated second parameters are used to predict the second label in the first loop based on the training data including the labeling errors.

16. The system of claim 15, wherein the first parameters include encoder parameters used by an encoder to encode the training data and decoder parameters used by a decoder to classify the encoded training data.

17. The system of claim 16, wherein the first loop comprises:
   receiving a first input data from the source;
   encoding the first input data to generated encoded first input data based on the encoder parameters; and
   classifying, based on the first parameters, the first input data to have the first label.

18. The system of claim 17, wherein the operations further comprise:
   determining a source loss based on the first label and the second label; and
   updating the first parameters based on the source loss to generate the updated first parameters.

19. The system of claim 17, wherein the operations comprise:
   in the first loop, predicting the second label for the first input data based on the second parameters;
   in the second loop, retrieving the correctly labeled ground truth label for second input data from the target;

in the second loop, computing a target loss based on the correctly labeled ground truth label and the third label generated by the decoder based on the second input data in accordance with the updated first parameters; and in the second loop, updating the second parameters based on the target loss to generate the updated second parameters.

20. The system of claim 19, wherein the source provides training data with inconsistent, incorrect, and missing labels; and the target provides training data with the correctly labeled ground truth label.

\* \* \* \* \*